United States Patent [19]

Kishi et al.

[11] 4,058,841
[45] Nov. 15, 1977

[54] MAGNETIC TAPE RECORDING AND/OR REPRODUCING APPARATUS WITH DEVICE FOR RECORDING AND/OR REPRODUCING CONTROL SIGNALS

[75] Inventors: Yoshio Kishi, Tokyo; Masaru Nagami, Yokohama, both of Japan

[73] Assignee: Sony Corporation, Tokyo, Japan

[21] Appl. No.: 635,249

[22] Filed: Nov. 25, 1975

[30] Foreign Application Priority Data

Nov. 27, 1974  Japan ........................... 49-136833

[51] Int. Cl.² .......................... G11B 5/43; G11B 5/78
[52] U.S. Cl. ................................. 360/27; 235/493; 360/134
[58] Field of Search ................ 360/27, 71, 90, 121, 360/130, 134; 235/61.12 M

[56] References Cited

U.S. PATENT DOCUMENTS

| 2,979,558 | 4/1961 | Leyton | 360/27 |
|---|---|---|---|
| 3,858,031 | 12/1974 | Kornfeld | 235/61.11 E |

Primary Examiner—Vincent P. Canney
Attorney, Agent, or Firm—Lewis H. Eslinger; Alvin Sinderbrand

[57] ABSTRACT

In an apparatus for recording and/or reproducing audio or other information signals in one or more record tracks on a face of a magnetic tape as the latter is guided in a predetermined path, for example, from a supply reel to a take-up reel; a magnetic head is disposed adjacent such path to engage an edge surface of the tape substantially at right angles to the face thereof for recording and/or reproducing a control signal in the tape from such edge surface, whereby to make available an increased proportion of the width of the tape for the record tracks and guard bands therebetween. Preferably, the head for recording and/or reproducing the control signal in the tape from an edge surface thereof is mounted at a tape guide member by which the tape is positioned in the direction of its width. Further, the control signal preferably has a low frequency, for example, of the order of 10 Hz, so as to minimize the spacing loss in recording or reproducing the control signal when the width of the tape is not precisely uniform.

8 Claims, 8 Drawing Figures

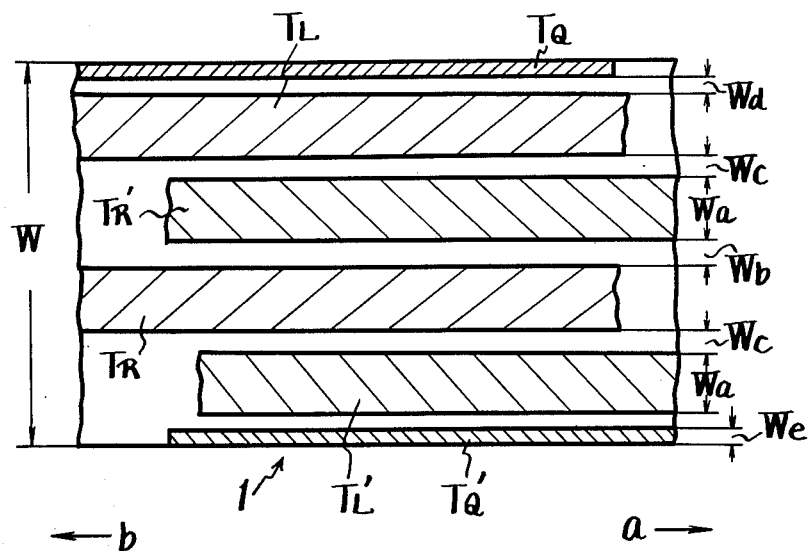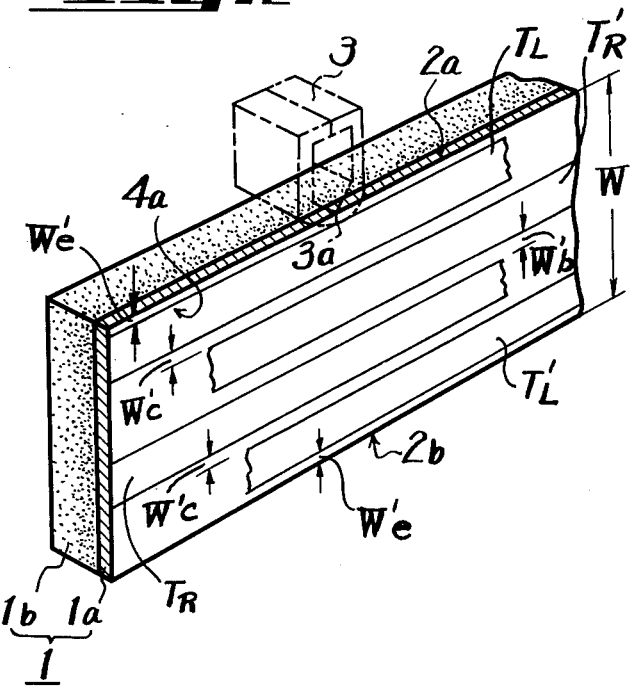

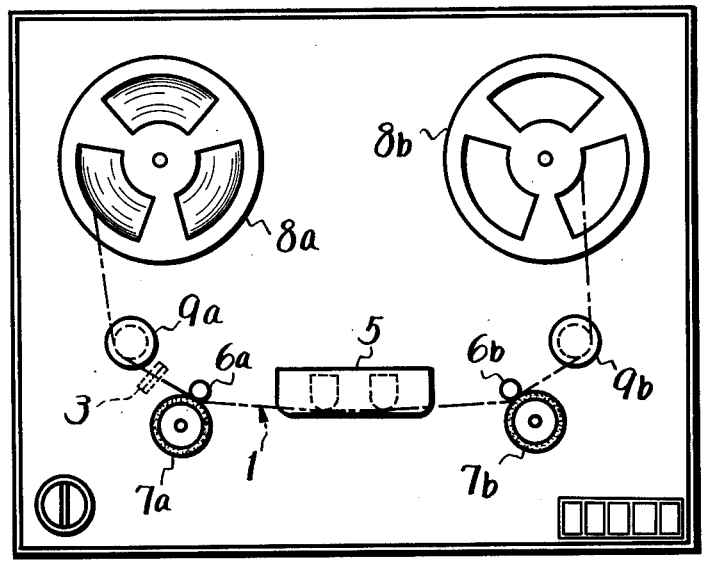
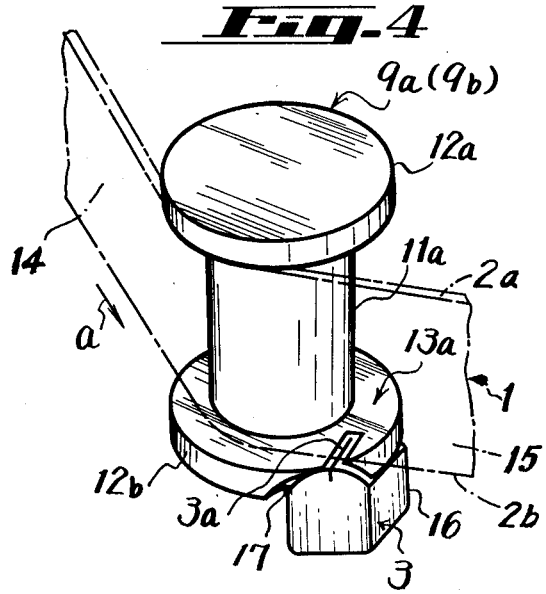
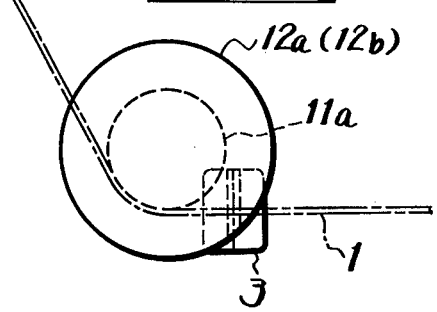
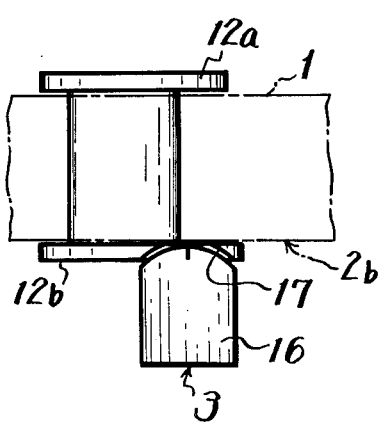

MAGNETIC TAPE RECORDING AND/OR REPRODUCING APPARATUS WITH DEVICE FOR RECORDING AND/OR REPRODUCING CONTROL SIGNALS

BACKGROUND OF THE INVENTION

1. Field of the Invention

This invention relates generally to apparatus for recording and/or reproducing audio or other information signals on a magnetic tape, and more particularly is directed to improvements in such apparatus by which a control signal is recorded and/or reproduced on the tape in addition to the information signals.

2. Description of the Prior Art

Apparatus for recording and/or reproducing audio or other information signals in one or more record tracks on a face of a magnetic tape has been provided with an additional magnetic head by which control or cue signals may be recorded and/or reproduced in one or more respective record tracks on the same face of the magnetic tape. Each such control signal record track usually extends along a longitudinal edge portion of the tape and may identify the portions of the tape on which respective information signals are recorded. Thus, the control or cue signals, when reproduced, may automatically control fast-forward or rewind operations of the apparatus, as when searching for a portion of the tape on which desired information signals are recorded. However, as previously mentioned, in the existing apparatus, each record track for the control or cue signals is provided on the same face of the tape as the record track or tracks for the information signals and is separated from the adjacent information signal record track by a respective guard band so as to reduce the likelihood of cross-talk between the signals recorded in the adjacent tracks, with the result that each control signal record track substantially reduces the effective width of the tape that is available to accommodate the record track or tracks for the information signals. Accordingly, the efficiency of utilization of the tape material for the recording of the information signals is reduced. Furthermore, the control or cue signals are not recorded continuously along the respective track or tracks, but rather are recorded for only very short intervals at locations spaced widely along the tape, so that much of the area of the tape reserved for the recording of the control or cue signals is not utilized at all.

OBJECTS AND SUMMARY OF THE INVENTION

Accordingly, it is an object of this invention to avoid the above mentioned disadvantages of the prior art in the recording and/or reproducing of control or cue signals in an apparatus for recording and/or reproducing audio or other information signals on a magnetic tape.

More specifically, it is an object of this invention to provide an apparatus, as aforesaid, in which the recording and/or reproducing of the control or cue signals is effected in a manner to very substantially improve the efficiency of utilization of the tape for the recording of information signals.

Another object is to provide an apparatus, as aforesaid, in which cross-talk between the control or cue signals and the information signals is avoided.

In accordance with an aspect of this invention, an apparatus for recording and/or reproducing audio or other information signals in one or more record tracks on a face of a magnetic tape as the latter is guided in a predetermined path, for example, from a supply reel to a take-up reel, is provided with a magnetic head disposed adjacent such path to engage an edge surface of the tape substantially at right angles to the face thereof for recording and/or reproducing control or cue signals in the tape from such edge surface, whereby to make available an increased proportion of the width of the tape for accommodating the information signal record tracks and guard bands therebetween.

Further, it is a feature of the invention that the magnetic head for recording and/or reproducing the control or cue signals, as aforesaid, is mounted at a tape guide member by which the tape is positioned in the direction of its width. It is still another feature of the invention to provide the control or cue signals with a low frequency, for example, of the order of 10 Hz, so as to minimize the spacing loss in recording or reproducing the control or cue signals when the width of the tape is not precisely uniform.

The above, and other objects, features and advantages of the invention, will become apparent from the following detailed description of illustrative embodiments thereof which is to be read in connection with the accompanying drawings.

BRIEF DESCRIPTION OF THE DRAWINGS

FIG. 1 is an enlarged diagrammatic view of the face of a length of magnetic tape showing, by way of example, the record tracks provided thereon in accordance with the prior art for receiving the information signals and the record or cue signals;

FIG. 2 is a diagrammatic, enlarged perspective view of a length of magnetic tape and illustrating the manner in which control or cue signals are recorded and reproduced in accordance with the present invention;

FIG. 3 is a schematic plan view of a magnetic tape recording and/or reproducing apparatus embodying the present invention;

FIG. 4 is an enlarged perspective view showing a preferred mounting arrangement of the magnetic head for recording and/or reproducing control or cue signals in an apparatus according to this invention;

FIGS. 5 and 6 are respectively a plan view and a front elevation view of the mounting arrangement shown on FIG. 4;

DESCRIPTION OF THE PREFERRED EMBODIMENTS

Figure 7:
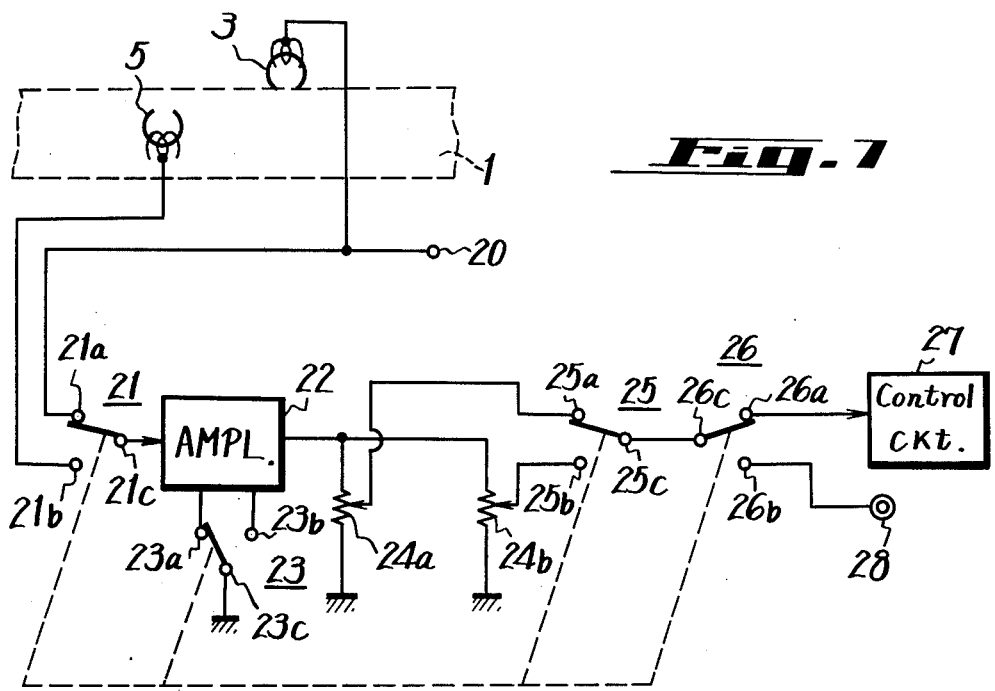
FIG. 7 is a schematic diagram of a circuit arrangement that may be used in a magnetic tape recording and/or reproducing apparatus according to this invention.

Referring to the drawings in detail, and initially to FIG. 1 thereof, it will be seen that a magnetic tape 1 is there illustrated with record tracks that result when the tape is recorded in the 4-track, 2-channel manner. More specifically, during the movement of the tape in the direction of the arrow $a$, information signals, such as, the L-channel signal and the R-channel signal of a stereophonic audio signal, are respectively recorded in laterally spaced, parallel record tracks $T_L$ and $T_R$ which extend longitudinally along a face of the magnetic tape;

whereas, when the tape is moved in the direction of the arrow b, the L-channel and R-channel signals are respectively recorded in laterally spaced record tracks $T'_L$ and $T'_R$ and which extend longitudinally along the same face of the magnetic tape. In accordance with the prior art, when control or cue signals are also to be recorded on the magnetic tape 1 for the purpose previously described herein, such control or cue signals identifying the locations of the information signals in tracks $T_L$ and $T_R$ are recorded, during movement of the tape in the direction of the arrow a, in a record track $T_Q$ provided on the same face of the tape as the information signal record tracks and extending along one longitudinal edge portion of the tape; whereas, during movement of the tape in the opposite direction, that is, in the direction of the arrow b, the control or cue signals identifying the locations of the information signals in tracks, $T'_L$ and $T'_R$ are recorded in a similarly disposed record track $T'_Q$ extending along the opposite longitudal edge portion of the tape.

Since the record tracks $T_Q$ and $T'_Q$ provided for the control or cue signals in accordance with the prior art are located on the same face of magnetic tape 1 as the record tracks $T_L, T_R, T'_L$ and $T'_R$ for receiving the audio or information signals, it will be apparent that the record tracks $T'_Q$ and $T'_Q$ necessarily detract from the effective width of the tape 1 that can be employed for the recording of the audio or information signals. For example, in the case of a magnetic tape intended to be recorded in the 4-track, 2-channel manner in a recording and/or reproducing apparatus of the open reel type, the width W of tape 1 is standardized at 6.3 mm.; the width $W_a$ of each of the information signal record tracks $T_L, T_R, T'_L$ and $T'_R$ is 1.05 mm.; the width $W_b$ of the central guard band between information signal record tracks $T_R$ and $T'_R$ is 0.46 mm.; and the width $W_c$ of the guard band between information signal record tracks $T_L$ and $T'_R$ and of the guard band between information signal record tracks $T'_L$ and $T_R$ is 0.32 mm. Thus, the aggregate width of the information signal record tracks and the guard bands therebetween is 5.3 mm., so that the residual width of the tape that remains for accommodating the control signal record tracks $T_Q$ and $T'_Q$ and their respective guard bands is 1.00 mm. Usually, the control signal record tracks $T_Q$ and $T'_Q$ are each provided with a width $W_e$ of 0.25 mm., so that the guard bands separating such tracks $T_Q$ and $T'_Q$ from the adjacent information signal record tracks $T_L$ and $T'_L$, respectively, will each have a similar width $W_d$ of about 0.25 mm. It will be apparent that, since 1.00 mm. of the tape width is employed for control signal record tracks $T_Q$ and $T'_Q$ and the respective guard bands, the efficiency of utilization of the width of the tape for the recording of information signals thereon is reduced. Further, since the control or cue signals are only recorded for very short intervals at relatively widely spaced apart locations along the tracks $T_Q$ and $T'_Q$, the efficiency of utilization of the tracks $T_Q$ and $T'_Q$ for the recording of the control signals is very low as compared with the efficiency of utilization of the tracks $T_L, T_R, T'_L$ and $T'_R$ for the recording of the information signals. Furthermore, when a plurality of record tracks for receiving information signals are provided on a magnetic tape, as on FIG. 1, the occurrence of cross talk between signals recorded in adjacent tracks is minimized by increasing the widths of the guard bands therebetween. However, since the tape 1 has a standardized width of 6.3 mm., the provision of the control signal record tracks $T_Q$ and $T'_Q$ on the same face of the tape as the record tracks for the information signals necessarily restricts the widths of the guard bands that may be provided between the several record tracks and thereby leads to the likelihood that cross talk will occur between the signals recorded in adjacent tracks.

Generally, in accordance with this invention, the above described disadvantages inherent in the recording of control or cue signals in a record track or tracks on the same face of the magnetic tape as the information signal record tracks are avoided by recording the control or cue signals in the tape from at least one of the edge surfaces thereof disposed at right angles to the face of the tape. More specifically, as shown on FIG. 2, the recording and reproducing of control or cue signals in accordance with this invention may be applied to a conventional magnetic tape 1 which is shown to consist of a relatively thin layer or coating 1a of a magnetic material, such as, $\gamma$-$Fe_2O_3$,C $\gamma_2$O or the like on a nonmagnetic base or layer 1b, for example, of polyester film or the like, so that the magnetic layer 1a defines the face 4a of the tape 1 in which the audio or other information signals are recorded, for example, in the tracks $T_L, T_R, T'_L$ and $T'_R$. In accordance with this invention, a magnetic recording and/or reproducing head 3 is arranged with its gap 3a confronting or contacting one of the side edge surfaces 2a and 2b of magnetic layer 1a, which edge surfaces are at right angles to the face 4a, so that the head 3 is effective to record or reproduce control or cue signals in magnetic layer 1a of the tape from the edge surface 2a or 2b thereof.

As shown on FIG. 3, the present invention may be embodied in an otherwise conventional magnetic tape recording and/or reproducing apparatus of the dual-capstan, close-loop type having a magnetic head assembly 5 adapted for recording and reproducing information signals in magnetic layer 1a of the tape 1 from the face 4a thereof, and being located between a pair of capstans 6a and 6b which cooperate with respective pinch rollers 7a and 7b for driving or moving tape 1 longitudinally in a closed-loop past head assembly 5. The tape 1 is wound on a supply reel 8a and is guided therefrom by a tape guide member 9a to enter the closed loop at capstan 6a and pinch roller 7a, and the tape leaving the closed loop at capstan 6b and pinch roller 7b is guided by a tape guide post or member 9b to a take-up reel 8b. The tape guide members 9a and 9b are, of course, effective to determine the path followed by the tape 1 between supply and take-up reels 8a and 8b, and such tape guide members are formed, as hereinafter described, to also position the tape in the direction of its width. In a magnetic tape recording and/or reproducing apparatus as shown on FIG. 3, the magnetic head 3 according to this invention for recording and/or reproducing control or cue signals in the tape 1 from an edge surface of the latter is preferably disposed adjacent one of the tape guide members 9a and 9b, for example, adjacent the member 9a, as shown on FIG. 3, so that such tape guide member 9a in establishing the position of the tape in the direction of its width will substantially ensure the engagement of head 3 with the adjacent edge surface of the tape.

More specifically, as shown on FIGS. 4, 5 and 6, in a preferred arrangement according to this invention, each of the tape guide members 9a and 9b includes a post 11a having a cylindrical guide surface slidably engageable by a face of the tape 1, and flange portions 12a and 12b projecting radially beyond the cylindrical guide surface of post 11a at the top and bottom of the latter for engagement with the opposite edge surfaces of tape 1 to establish the position of the latter in the direction of its width. The tape 1 is wrapped about a portion of the cylindrical guide surface defined by post 11a and has runs 14 and 15 extending tangentially to the cylindrical guide surface from supply reel 8a and from the cylindrical guide surface to capstan 6a, respectively. Preferably, the housing 16 of magnetic head 3 is disposed in a recess 17 formed in one of the flange portions 12a and 12b, for example, in the lower flange portion 12b, as shown, and such recess 16 has an opening at the upper surface 13a of flange portion 12b through which the gap 3a of head 3 can extend for engagement with the adjacent edge surface 2b of the tape in the tangential run 15. The recess 17 and its opening at surface 13a are disposed so that the longitudinal direction of the gap 3a of the magnetic head disposed in such recess 17 will extend transversely with respect to the tangential run 15 of the tape, and further so that the edge surface 2b of the tape will traverse substantially the middle of gap 3a. Of course, the recess 17 for accommodating the magnetic head 3 may be disposed in the upper flange portion 12a of one or the other of tape guide members 9a and 9b so that head 3 disposed in such recess would be engageable with the upper edge surface 2a of the guided tape. Further, the recess 17 could be disposed so that the head 3 accommodated therein would be engageable with the edge surface 2a or 2b of the tape in the tangential run 14 extending from supply reel 8a to the cylindrical guide surface of post 11a.

In any case, it will be apparent that, during a recording operation, the engagement of the gap 3a of head 3 with an edge surface 2a or 2b of tape 1 causes a control or cue signal supplied to the head 3 to be recorded in the tape from the engaged edge surface 2a or 2b. Alternatively, the magnetic head 3 may be operative to reproduce the thus recorded control or cue signal from the engaged edge surface 2a or 2b. In recording a control or cue signal in the tape 1 from its edge surface 2a or 2b, the depth of the recording of the control or cue signal may be only about 0.15 mm. measured in the direction of the width of the tape from the edge surface 2a or 2b engaged by head 3.

Accordingly, when the head 3 for recording and/or reproducing control or cue signals is engaged with an edge surface 2a or 2b of the tape so that the control signal is recorded in the tape from such edge surface to a limited depth, for example, about 0.15 mm., such control or cue signals can be provided on the tape without substantially reducing the effective width of the tape available for the recording thereon of the audio or information signals. For example, as shown on FIG. 2, if control or cue signals are recorded in the tape 1 from each of its edge surfaces 2a and 2b to a depth $W'_c$ of 0.15 mm. and the overall width W of the tape is once again the standard dimension of 6.3 mm., then the width of the tape that remains available for accommodating the information signal record tracks $T_L, T_R, T'_L$ and $T'_R$ and the guard bands therebetween is 6.0 mm., that is, 0.7 mm. greater than the effective width of the tape available for the information signal record tracks and the guard bands therebetween when the control or cue signals are recorded in accordance with the prior art as illustrated on FIG. 1. Thus, if it is again assumed that the width of each of the four information signal record tracks is 1.05 mm., then the recording of the control or cue signals in accordance with this invention, that is, from the opposite edge surfaces 2a and 2b of the tape, makes it possible to substantially increase the widths of the guard bands between the information signal record tracks, for example, to provide the central guard band between tracks $T_R$ and $T'_R$ with a width $W'_b$ of 0.76 mm., while the guard bands between the tracks $T_L$ and $T'_R$ and between the tracks $T'_L$ and $T_R$ are each provided with an increased width $W'_c$ of 0.52 mm. It will be apparent that such increased widths of the guard bands between the information signal record tracks substantially avoids the likelihood of cross-talk between the information signals recorded in such record tracks. Furthermore, since the control or cue signals are recorded in the tape from an edge surface 2a or 2b thereof, that is, in a direction at right angles to the tape face 4a from which the information signals are recorded in the tape, and since the magnetic heads 3 and 5 for reproducing the control signals and the information signals, respectively from the tape have their head gaps disposed to confront or engage the surface 2a or 2b and surface 4a, which are at right angles to each other, any cross talk between the recorded control signals and information signals is entirely eliminated.

Further, in accordance with this invention, the control or cue signals recorded in the tape 1 from one or both of the edge surfaces 2a and 2b have a very low frequency for example, of the order of about 10 Hz, so as to minimize the spacing loss, that is, the reduction in the level of the control or cue signals that may arise during recording or reproducing thereof by reason of variations in the contact of the magnetic head 3 with the edge surface 2a or 2b of the tape as a result of slight variations in the width of the tape, for example, as when the side or longitudinal edge of the tape has undulations therein. Accordingly, by employing the described low frequency for the control or cue signals, such signals can be reliably and effectively recorded and reproduced from an edge surface 2a or 2b of the tape.

Referring now to FIG. 7 in which elements corresponding to those previously described are identified by the same reference numerals, it will be seen that, in a magnetic tape recording and/or reproducing apparatus according to this invention, the magnetic head 3 for recording or reproducing control or cue signals is connected to an input terminal 20 which, during a recording operation of the apparatus, receives the control or cue signals, for example, from an oscillator and an amplifier (not shown). The head 3 is further shown to be connected to a fixed contact 21a of a change-over switch 21 which further has a fixed contact 21b connected to the information signal reproducing head 5, and a movable contact 21c which is selectively engageable with the fixed contact 21a or the fixed contact 21b. The movable contact 21c of changeover switch 21 is connected to the input of a reproducing amplifier 22 which is controllable to selectively have first and second frequency characteristics. For example, as shown schematically reproducing amplifier 22 may have first and second control terminals respectively connected to fixed contacts 23a and 23b of a change-over switch 23 which further has a movable contact 23c connected to ground and being selectively engageable with fixed contact 23a or fixed contact 23b for establishing the first and second frequency characteristics of amplifier 22. Usually, a magnetic tape recording and/or reproducing apparatus of the type shown schematically on FIG. 3 advances or moves the tape longitudinally at a predetermined relatively slow or normal speed by means of the capstans 6a and 6b and associated pinch rollers 7a and 7b during information signal recording and reproducing operations. However, during fast-forward and rewind operations of the apparatus, the pinch rollers 7a and 7b are spaced from the respective capstans 6a and 6b and the takeup reel 8b or the supply reel 8a is rapidly rotated so that the tape 1 is then moved past the head 3 at a relatively high speed which is usually about twenty times greater than the normal tape speed or recording or reproducing operations. Thus, if the control or cue signals recorded in the tape during a recording operation of the apparatus have a frequency of about 10 Hz, as previously described, then the frequency of such control or cue signals, when reproduced by the head 3 during a fast-forward or rewind operation of the apparatus, will be about 200 Hz. Therefore, the reproducing amplifier 22 on FIG. 7 is arranged so that its first frequency characteristic established when movable contact 23c engages fixed contact 23a is selective to provide good distortion-free amplification of signals in the vicinity of 200 Hz, whereas, when movable contact 23c is engaged with fixed contact 23b, the resulting second frequency characteristic of amplifier 22 is the usual equalizer characteristic for an audio reproducing amplifier.

The output of amplifier 22 is connected to ground through the parallel connected resistance elements of first and second variable resistors 24a and 24b provided for adjusting the gain or level of the output of amplifier 22. The movable taps of variable resistors 24a and 24b are respectively connected to fixed contacts 25a and 25b of a change-over switch 25 which further has a movable contact 25c selectively engageable with one or the other of the fixed contacts 25a and 25b. The positions of the movable taps of variable resistors 24a and 24b are adjusted so that, when movable contact 25c engages fixed contact 25a, the gain or level of the output of amplifier 22 thus delivered to contact 25c is substantially greater than the gain or level of the output of amplifier 22 transmitted to movable contact 25c when the latter engages fixed contacts 25b.

The output of reproducing amplifier 22 obtained from change-over switch 25 is selectively applied through a change-over switch 26 to either a control circuit 27 or an output terminal 28. More specifically, as shown, change-over switch 26 has fixed contacts 26a and 26b respectively connected to control circuit 27 and output terminal 28 and being selectively engageable by a movable contact 26c of switch 26 which is connected to the movable contact 25c of switch 25. The control circuit 27 may be adapted so that, when it receives the reproduced control or cue signals during a fast-forward or rewind operation, control circuit 27 automatically controls the movement of the tape on the basis of the reproduced control or cue signals, for example, as when searching the tape for particular recorded information signals which are identified by respective control or cue signals. On the other hand, the output terminal 28 is adapted to deliver the reproduced audio or other information signals during a reproducing operation of the apparatus.

As is indicated schematically on FIG. 7, change-over switches 21,24,25 and 26 are ganged together with a mode selecting switch (not shown) of the recording and/or reproducing apparatus so that the movable contacts 21c,23c,25c and 26c are engaged with the fixed contacts 21a,23a,25a and 26a, respectively, when the apparatus is in its fast-forward and rewind modes of operation, whereas, when the apparatus is in its normal reproducing mode of operation, the movable contacts 21c,23c,25c and 26c are engaged with the fixed contacts 21b,23b,25b and 26b, respectively.

The circuit arrangement illustrated on FIG. 7 operates as follows:

When the apparatus is in its normal reproducing mode of operation, that is, when switches 21,23,25 and 26 are changed-over from the positions shown on the drawing, the information signals reproduced by head 5 are supplied through engaged contacts 21b and 21c of switch 21 to the reproducing amplifier 22 which is then conditioned, in response to the engagement of contacts 23b and 23c of switch 23, to amplify the reproduced information signals with predetermined equalizer characteristics. In the normal reproducing mode of operation, the level or gain of the output of amplifier 22 is determined by variable resistor 24b, and the amplified information signals are delivered from amplifier 22 through engaged contacts 25b and 25c of switch 25 and engaged contacts 26b and 26c of switch 26 to output terminal 28.

When the recording and/or reproducing apparatus is in either its fast-forward or rewind mode of operation, that is, when switches 21,23,25 and 26 are positioned as shown on FIG. 7, the control or cue signals reproduced from the edge surface of tape 1 by magnetic head 3 are supplied to the input of reproducing amplifier 22 by way of the engaged contacts 21a and 21c of switch 21. Since the speed of movement of tape 1 in the fast-forward or rewind mode of operation is approximately twenty times the speed of movement of the tape in the recording and reproducing modes of operation, the control or cue signals recorded with a frequency of about 10 Hz are reproduced by the head 3 with a frequency of about 200 Hz during fast-forward and rewind operations. Therefore, in the fast-forward or rewind mode of operation, the engagement of contacts 23a and 23c of switch 23 changes the frequency characteristic of reproducing amplifier 22 to substantially correspond to the approximate 200 Hz frequency of the reproduced control or cue signals then being applied to the input of amplifier 22.

In the fast-forward or rewind mode of operation of the apparatus, the amplified control or cue signals are supplied from the output of amplifier 22 through variable resistor 24a, engaged contacts 25a and 25c of switch 25 and engaged contacts 26a and 26c of switch 26 to control circuit 27. Since the control or cue signals are, in accordance with this invention, recorded in tape 1 from the edge surface 2a or 2b of its magnetic layer 1a which is, as usual, quite thin, the width of the record track for the control or cue signals, as defined by the thickness of magnetic layer 1a, is quite small. Thus, in the fast-forward or rewind mode of operation of the apparatus, the output of magnetic head 3, that is, the reproduced control or cue signals are of relatively low amplitude or level and, accordingly, the variable resistor 24a which then determines the level or gain of the output from amplifier 22 is adjusted to substantially increase such gain or level.

From the foregoing, it will be apparent that, in the circuit arrangement described above with reference to FIG. 7, the reproducing amplifier 22 provided for amplifying the reproduced information signals in the normal reproducing mode of operation of the apparatus is also employed for amplifying the reproduced control or cue signals in the fast-forward or rewind mode of operation, whereby to simplify the construction of the apparatus. Further, it will be apparent that such dual use of amplifier 22 is made possible by the fact that the frequency characteristics and gain of amplifier 22 are changed or varied for the reproducing mode of operation and for the fast-forward or rewind mode of operation so as to coincide with the respective characteristics of the reproduced signals from the heads 5 and 3, respectively. Thus, in the reproducing mode of operation, the audio or other information signals delivered to output terminal 28 are of good quality and, similarly, in the fast-forward or rewind mode of operation, the control or cue signals delivered to control circuit 27 are also of good quality so that such circuit 27 can reliably function, for example, in controlling the movements of the tape during a searching operation.

Figure 8:
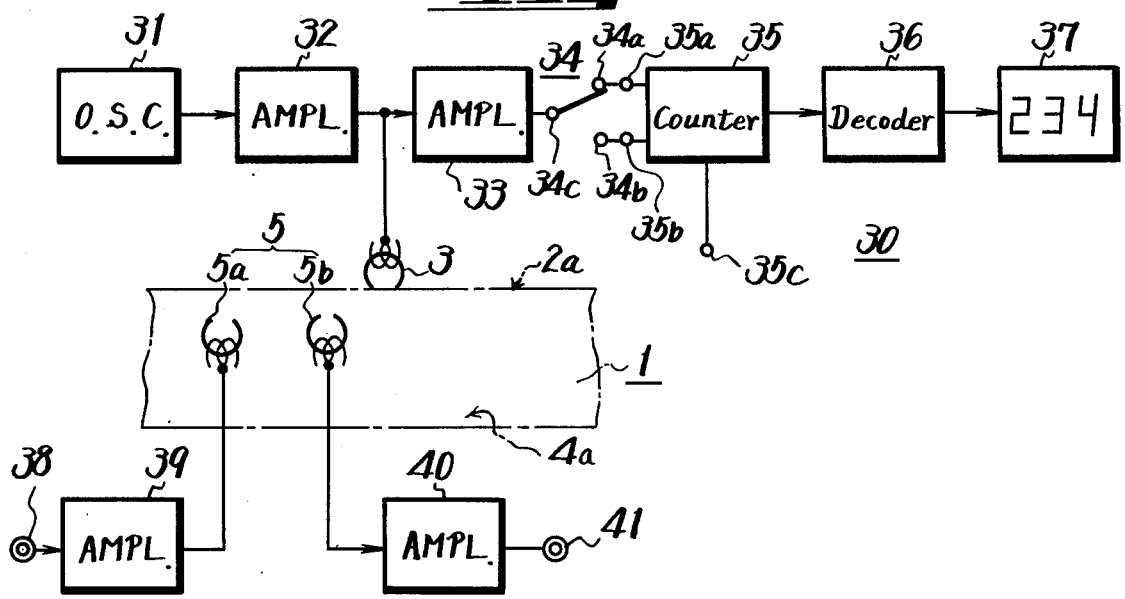
FIG. 8 is a schematic diagram of another circuit arrangement that may be used in a magnetic tape recording and/or reproducing apparatus according to this invention.

Referring now to FIG. 8, it will be seen that control signals recorded and reproduced in accordance with this invention may also be employed in a magnetic tape recording and/or reproducing apparatus for operating a tape counter 30 which visually indicates the tape position, that is, the portion of the tape disposed adjacent the information signal recording and reproducing head assembly 5, when the apparatus is in a recording or reproducing mode of operation, as well as when the apparatus is in a fast-forward or rewind mode of operation. More specifically, in the circuit arrangement shown on FIG. 8, a pulse oscillator 31 is made operative in the recording mode of operation of the apparatus to produce control or position indicating signals in the form of pulses with predetermined intervals therebetween which are supplied through an amplifier 32 to the magnetic head 3. In accordance with this invention, the head 3 records the control or position indicating signals in tape 1 from the edge surface 2a thereof. The connection point between amplifier 32 and head 3 is connected through an amplifier 33 to a movable contact 34c of a change-over switch 34 having fixed contacts 34a and 34b which are selectively engaged by movable contact 34c in the recording, reproducing or fast-forward mode of operation of the apparatus and in the rewind mode of operation, respectively. The tape counter 30 is shown to include a reversible counter 35 having an adding input terminal 35a connected to fixed contact 34a and a subtracting input terminal 35b connected to fixed contact 34b. The counter 35 is further shown to have a reset terminal 35c which is adapted to receive a suitably produced reset signal by which the contents of counter 35 are reset to zero. The tape counter 30 is further shown to include a decoder 36 which decodes the output or contents of counter 35 and suitably controls or operates an indicator or display device 37 which may be a digital indicator employing a Nixie tube, a luminescent diode or the like.

In the arrangement of FIG. 8, the head assembly 5 for the information signals is shown to include a recording head 5a connected with an input terminal 38 for the information signals by way of a recording amplifier 39, and a reproducing head 5b connected through a reproducing amplifier 40 with an output terminal 41 for the reproduced information signal.

The circuit arrangement shown on FIG. 8 operates as follows:

In the recording mode of operation, information signals applied to input terminal 38 and amplified by amplifier 39 are recorded on the face 4a of the magnetic layer 1a of tape 1 shown on FIG. 2 by means of the recording head 5a and, simultaneously, pulse oscillator 31 is operated so that the pulses produced thereby and constituting the control or position indicating signals are supplied through amplifier 32 to magnetic head 3 for recording in edge surface 2a of tape 1 at spaced apart positions along the tape determined by the speed of movement of the tape in the recording mode of operation of the apparatus. Further, in such recording mode of operation, switch 34 is in the position shown on FIG. 8 so that the pulses constituting the control or position indicating signal are also supplied from amplifier 32 through amplifier 33 and switch 34 to the adding input terminal 35a of counter 35 with the result that the latter counts the pulses and successively increases the contents of counter 35. The contents or output of counter 35 are decoded by decoder 36 which, in turn, controls indicator 37 so that the latter visually displays a progressively increasing number representing the position along tape 1 at which the information signals are being recorded.

Upon the completion of a recording operation, the apparatus may be changed over to its rewind mode of operation. In such mode, switch 34 engages its movable contact 34c with fixed contact 34b and the tape 1 is rapidly driven in the direction to rewind the tape on the supply reel. During such rewind operation, the control or position indicating signals are reproduced by magnetic head 3 and applied through amplifier 33 and engaged contacts 34c and 34b of switch 34 to the subtracting input terminal 35b of counter 35. Thus, the contents of counter 35 are progressively reduced and decoded by decoder 36 so that indicator 37 will display a progressively decreasing number. When the number displayed by indicator 37 corresponds to a desired location along the tape, the rewind operation can be halted and the reproducing mode of operation of the apparatus can be established. During a reproducing operation of the apparatus, switch 34 is returned to the position shown on FIG. 8 so that the control or position indicating signals reproduced by head 3 are again supplied through amplifier 33 and switch 34 to the adding input terminal 35a of counter 35 with the result that the contents of counter 35 are progressively increased and indicator 37 therefore displays a progressively increasing number. In the reproducing mode of operation, head 5b reproduces the information signals recorded on tape 1, and such reproduced amplifier signals are supplied through amplifier 40 to output terminal 41. When the apparatus is changed over to its fast-forward operating mode so that the tape is moved at a relatively high speed in the direction to wind the tape on the takeup reel, switch 34 remains in the position shown on FIG. 8 so that the control or position indicating signals reproduced by head 3 are again supplied to the adding input terminal 35a of counter 35 and cause the indicator 37 to display a number having a value that progressively increases at a correspondingly high rate.

If at a predetermined position of a tape, for example, the starting position thereof in which the tape is fully wound on the supply reel, a reset signal is supplied to reset terminal 35c of counter 35 for resetting the contents thereof to zero, then the number displayed by indicator 37 will always correspond to the actual position of the tape following any desired sequence of recording, reproducing, fast-forward and rewind operations. Thus, the arrangement shown on FIG. 8 is particularly suited for use in magnetic tape recording and/or reproducing apparatus to be employed in editing information signals recorded on the tape, or when it is desired to rapidly locate or search for desired information signals on a particular portion of the tape.

It is to be understood that tapes prerecorded with information signals, for example, in tracks as indicated at $T_L, T_R, T'_L$ and $T'_R$ on FIGS. 1 and 2, can be used in a magnetic recording and/or reproducing apparatus according to this invention, even through such prerecorded tapes do not have control or cue signals recorded in the edge surfaces thereof. When such prerecorded tapes are used in apparatus according to this invention, control signals may be recorded by such apparatus on one or both of the edge surfaces of the prerecorded tape, as described previously herein, since such control signals will not interfere with the information signals previously recorded on the tape. Further, it is apparent that apparatus according to this invention may use the presently standardized tape. Thus, there is no problem of interchangeability between tapes recorded or used in an apparatus according to the present invention and in conventional or previously existing magnetic tape recording and/or reproducing apparatus.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In an apparatus for recording and/or reproducing information signals in at least one record track on a face of a magnetic tape as the latter is guided to move longitudinally in a predetermined path; means disposed adjacent said path for recording and/or reproducing a control signal in an edge surface of the tape which edge surface is substantially at right angles to said face of the tape.

2. An apparatus according to claim 1; in which said means for recording and/or reproducing the control signal includes a magnetic head engageable with said edge surface of the tape.

3. An apparatus according to claim 2; further comprising a tape guide member by which the tape is guided in the direction of its width in said path; and in which said magnetic head is mounted at said tape guide member.

4. An apparatus according to claim 3; in which said tape guide member includes flange portions engageable with the opposite edge surfaces of the tape, and one of said flange portions has an opening therein in which said magnetic head extends for engaging the adjacent edge surface of the tape.

5. An apparatus according to claim 4; in which said tape guide member has a cylindrical guide surface extending between said flange portions, and the tape in said path has runs extending tangentially to and from said cylindrical guide surface; and in which said magnetic head has a gap which is disposed with its longitudinal direction extending transversely with respect to one of said tangential runs of the tape.

6. An apparatus according to claim 2; in which said control signal has a frequency of approximately 10 Hz so as to encounter a minimum spacing loss when being recorded and reproduced.

7. A magnetic tape recording and/or reproducing apparatus comprising tape drive means for moving a magnetic tape in the longitudinal direction of the latter, guide means for guiding the tape in a predetermined path during the movement of the tape by said drive means, first magnetic head means disposed adjacent said path and confronting a face of the tape for recording and/or reproducing information signals in at least one record track on said face, and second magnetic head means disposed adjacent said path and confronting an edge surface of the tape at right angles to said face of the latter for recording and/or reproducing control signals in the tape from said edge surface thereof.

8. A magnetic tape recording and/or reproducing apparatus according to claim 7; in which said guide means includes a tape guide member having a spaced apart flange portions engageable with the opposite edge surfaces of the tape for positioning the latter in the direction of its width, and one of said flange portions has an opening therein in which said second magnetic head means is disposed for engaging the adjacent edge surface of the tape.

* * * * *